US009679585B2

(12) United States Patent
Bapu et al.

(10) Patent No.: US 9,679,585 B2
(45) Date of Patent: Jun. 13, 2017

(54) RECORD PLAYER

(71) Applicant: Gramovox, LLC, Chicago, IL (US)

(72) Inventors: Pavan Bapu, Chicago, IL (US); Daniel Schaumann, Chicago, IL (US); Frank Pistorio, Itasca, IL (US)

(73) Assignee: Gramovox, LLC, Chicago, IL (US)

( * ) Notice: Subject to any disclaimer, the term of this patent is extended or adjusted under 35 U.S.C. 154(b) by 0 days.

(21) Appl. No.: 15/055,449

(22) Filed: Feb. 26, 2016

(65) Prior Publication Data

US 2016/0254010 A1    Sep. 1, 2016

Related U.S. Application Data

(60) Provisional application No. 62/250,764, filed on Nov. 4, 2015, provisional application No. 62/121,053, filed on Feb. 26, 2015.

(51) Int. Cl.
G11B 3/60      (2006.01)
G11B 3/61      (2006.01)

(52) U.S. Cl.
CPC . *G11B 3/60* (2013.01); *G11B 3/61* (2013.01)

(58) Field of Classification Search
CPC .................................... G11B 3/61; G11B 3/60
See application file for complete search history.

(56) References Cited

U.S. PATENT DOCUMENTS

| 2,489,146 | A | * | 11/1949 | Louchheim | G11B 17/10 362/87 |
|---|---|---|---|---|---|
| 3,363,907 | A | * | 1/1968 | Charnock | G11B 17/10 369/191.1 |
| 3,417,998 | A | * | 12/1968 | Horzick | G11B 3/00 369/205 |
| 3,647,222 | A | * | 3/1972 | Kelly | G11B 3/26 369/218 |
| 3,650,539 | A | * | 3/1972 | Vazzano | G11B 17/16 369/209 |
| 3,734,512 | A | * | 5/1973 | Osborne | G11B 27/002 369/203 |
| 4,153,256 | A | * | 5/1979 | Guha | G11B 3/121 369/250 |
| 4,225,142 | A | * | 9/1980 | Zolt | G11B 3/12 366/254 |
| 4,332,024 | A | * | 5/1982 | Orchard | G11B 3/14 369/254 |
| 4,387,453 | A | * | 6/1983 | Zolt | G11B 3/12 369/263.1 |
| 4,403,317 | A | * | 9/1983 | Suzuki | G11B 17/0545 369/194 |

(Continued)

*Primary Examiner* — Brian Miller
(74) *Attorney, Agent, or Firm* — Richards Patent Law P.C.

(57) ABSTRACT

A record player includes a base including a front surface, a plinth including a front surface, a platter, and a tone arm. The base includes a base height, a base width, and a base depth, with the base height being the shortest dimension and the base width being the greatest dimension. The plinth is mounted atop the base and connected to a motor housed within the base. The plinth includes a plinth height, a plinth width, and a plinth depth, the plinth height being greater than the plinth width. The platter is rotationally mounted to the front surface of the plinth so that a diameter of the platter is nearly vertical above the base. The tone arm is secured to the front surface of the base.

14 Claims, 11 Drawing Sheets

(56) References Cited

U.S. PATENT DOCUMENTS

| | | | | | |
|---|---|---|---|---|---|
| 4,416,003 | A | * | 11/1983 | Suzuki | G11B 3/0955 369/199 |
| 4,628,500 | A | * | 12/1986 | Thigpen | G11B 3/38 369/249.1 |
| 4,744,072 | A | * | 5/1988 | Tamaki | G11B 17/032 720/612 |
| 7,382,713 | B2 | * | 6/2008 | Graham | G11B 3/10 369/252 |
| 7,630,288 | B2 | * | 12/2009 | Riggle | G11B 3/00 369/245 |
| 8,576,687 | B1 | * | 11/2013 | Schroder | G11B 3/12 369/222 |
| 9,244,105 | B2 | * | 1/2016 | Aubin | G01R 29/105 |

* cited by examiner

RECORD PLAYER

BACKGROUND OF THE INVENTION

The present subject matter relates generally to record players. More specifically, the present subject matter provides a record player including a platter and a tone arm in an almost upright position relative to a base to put the record and the tone arm in a position to be better seen during the operation of the record player.

A conventional record player reproduces sounds from a rotating record engraved with vertical modulations within grooves mounted on a rotating horizontal platter. During use, a needle or stylus follows the grooves and transmits the vibrations to a transducer, which converts the vibrations to electrical signals, which are converted into sound by an amplifier.

Typically, the platter is positioned horizontally on the base so that the record rests on the platter. A tone arm pivots about the base and includes the stylus at a first end and a counterweight at a second end. The stylus or needle rests within the grooves of the record by gravity. The counterweight provides a tracking force, or the downward pressure on the record, to the stylus.

It can be mesmerizing to watch a record spinning on a record player. The synchronized movement of the platter and tone arm is beautifully fluid and engaging to see. That the music produced synchronizes with the movement of the platter and tone arm only adds to the experience. Unfortunately, conventional record players operate with platters rotating in a horizontal plane, which means the angle to view the operation of the record player is from nearly directly above it and it is rare that a record player is located in a position that it would be comfortable for a listener (or group of listeners) to relax and listen to the music while in a position to observe the spinning record from above.

Prior attempts have been made to make record players that play with the platter in a vertical or near vertical position. However, their construction and operation has been complex, inefficient, or otherwise lacking in the user experience. Additionally, because the point of playing a record vertically is to add to the beauty of the experience, the aesthetic design or such record players is an important aspect of the product. Of course, for many users, the most important aspect of any record player is the sound quality.

Accordingly, there is a need for a record player designed for operating with the platter and tone arm in a nearly vertical position that provides both a high-quality listening experience and an attractive visual design.

BRIEF SUMMARY OF THE INVENTION

The present disclosure addresses the above-noted needs by providing a record player that plays a record in a "display position," i.e., in a nearly vertical orientation above the base of the record player. In order to provide a record player that provides quality sound reproduction and the visual interest of playing in the display position, the record player described herein incorporates innovation throughout a wide range of the record player's components. For example, amongst other innovations, the record player utilizes a unique motor-plinth-platter assembly, a unique tone arm and counterweight assembly, a unique record clamp, and a unique motor cover, each of which is described in the following paragraphs.

The major structural components of the record player can be generalized as a motor-plinth-platter assembly and a base-tone arm assembly that are adjustable in position relative to each other. In the primary embodiment of the record player, the platter is mounted on the plinth, which is in turn mounted to the motor. Separately, the tone arm is mounted to the base. The motor is then housed in the base and the plinth is supported by the base in a manner in which the entire motor-plinth-platter assembly is adjustable, as a unit, to move forwards and backwards within the base to allow for tone arm height adjustment, adjustments to compensate for various cartridge sizes, and to accommodate various tracking angles in order to maintain parallel positioning of the tone arm relative to the platter. In a primary example, the positioning of the assembly is adjusted from within the wood base by a pair of screws that extend through slots in the base into the plinth and can be loosened and tightened to move the position of the motor-plinth-platter assembly relative to the base. However, it is contemplated that the adjustment of the relative position of the two assemblies may be accomplished in a number of variations, whether from inside or outside of the base.

Because the relative position of the two assemblies can be adjusted, the tone arm positioning may be adjusted while maintaining the positioning of the motor and the platter. The adjustments may be necessary if, for example, the tone arm height needs to be modified for a specific record, a different sized cartridge is installed on the tone arm, or the tracking angle of the tone arm needs to be modified for a specific record. The ability to fine tune the position of the tone arm relative to the platter is a significant factor in the ability for the user to tune the performance of the record player and achieve high quality sound reproduction.

The tone arm itself is uniquely designed to track the record groove without favoring one groove sidewall over the other. For example, in order to accommodate the nearly vertical angle at which the platter spins and the record is played, the counterweight balances the tone arm vertically/radially, rather than horizontally as in a conventional turntable. As a result, the tone arm counterweight, which would typically apply the tracking force, is supplemented with a unique gimbal assembly including a spring and an adjustable setscrew. The adjustment of the setscrew controls the force from the spring and adjusts the tracking force.

In a primary example, the counterweight is attached to a microcellular urethane foam sleeve on the tone arm shaft by a friction fit (i.e., the sleeve is friction fit onto the tone arm and the counterweight is friction fit onto the sleeve). The sleeve isolates the counterweight and helps to reduce feedback. However, it is understood that other materials may be used in the sleeve used to isolate/insolate the counterweight from the tone arm.

In the primary example of the record player provided herein, the balance of the tone arm, cartridge, and stylus enables the needle to track in the center of the record's grooves rather than biased towards either of the walls of the groove. Balance is achieved by sliding the counterweight along the shaft axis of the tone arm, thereby changing the distance of the counterweight from the tone arm's main pivot. The position of the counterweight balances the arm radially around its main pivot bearing axis. You can imagine the tone arm as the big hand on a clock perfectly balanced around its main shaft. As such, you can position the big hand in any position on the clock dial and it will stay in that position due to balance, not due to friction. That is how well balanced the tone arm of the record player described herein is. After the tone arm has been radially balanced, it can be positioned anywhere in its 360 degrees of rotation and left to idle.

It is also believed that the position of the tone arm towards the center of the track section of the record may further contribute to the well-balanced design. As a result of the balanced tone arm, there is no need for an anti-skate adjustment.

The record clamp in a conventional turntable is a weight that slips over the spindle and, in some instances, is clamped in place to hold the record in place against the platter. In the presently described record player, the spindle is threaded at the exposed end to receive a threaded clamp that screws into place to compress the record against the platter, either with or without a mat between the record and platter. The depth of the threads on the spindle are designed to accommodate thin or thick records, while the portion of the spindle around which the record itself sits is unthreaded so as to not damage the record.

Another unique aspect of the presently described record player is the motor cover. The motor cover compresses the motor against the plinth and acts as a heat sink. The compression helps to minimize or eliminate motor vibration, which would otherwise be detrimental to the sound quality performance.

An object of the invention is to provide an aesthetically pleasing and innovative way to play records.

An advantage of the invention is that listeners may see a record displayed as it plays, allowing them to see the artist information and observe the record as it spins. This may be an engaging visual, especially for picture discs.

Additional objects, advantages and novel features of the examples will be set forth in part in the description which follows, and in part will become apparent to those skilled in the art upon examination of the following description and the accompanying drawings or may be learned by production or operation of the examples.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE DRAWINGS

Figure 1:
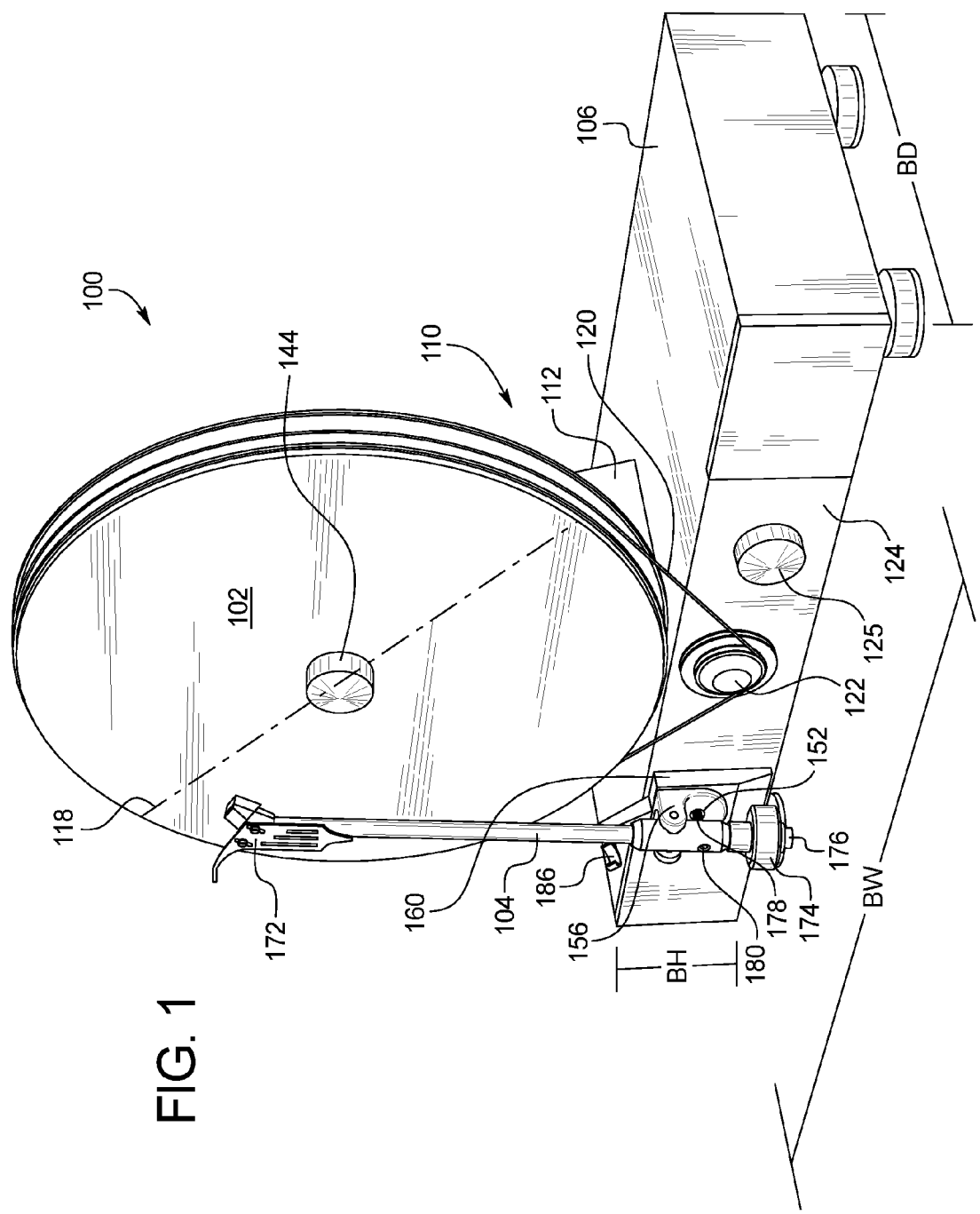
FIG. 1 is a front isometric view of a record player of the present application.

In order to meet these needs and others, the present invention discloses a record player 100 that plays a record 101 positioned vertically. Specifically, the record player 100 includes a platter 102 and a tone arm 104 positioned vertically relative to a horizontal base 106.

Figure 11:
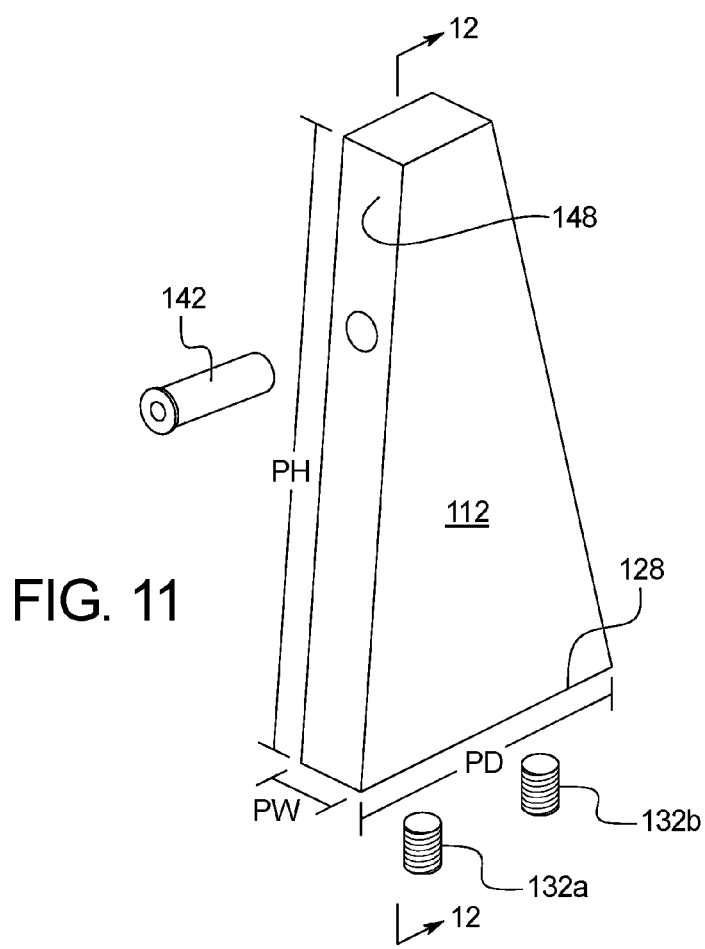
FIG. 11 is an isometric, exploded view of a plinth of the record player of FIG. 1.
Figure 12:
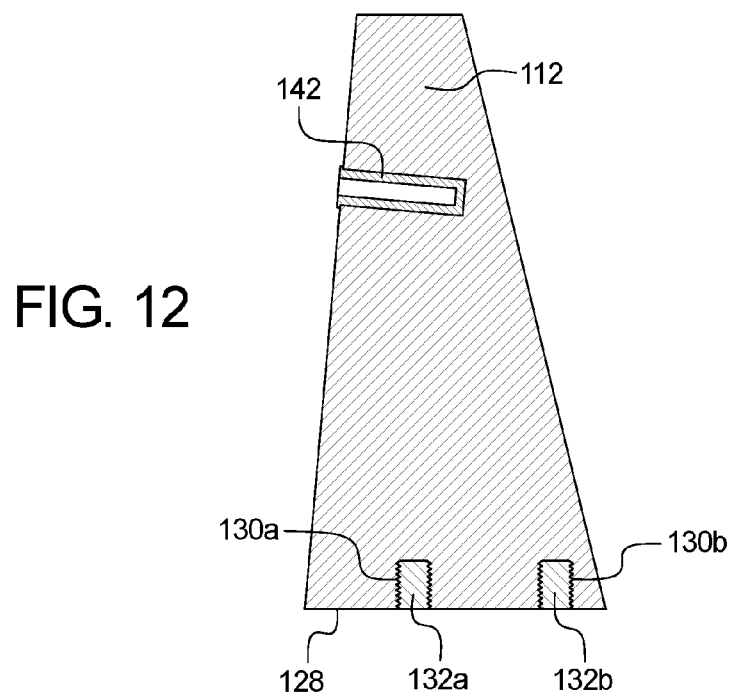
FIG. 12 is a cross sectional view of the plinth generally taken along lines 12-12 of FIG. 11.

Referring to FIGS. 1-8, the record player 100 of the present application includes a platter-plinth-motor assembly 110 that is vertically mounted to a horizontal base 106. The motor-plinth-platter assembly 110 includes the platter 102 secured to a plinth 112 that is mounted to a motor 114 positioned within a cavity 115 (FIG. 2) of the base 106 of the record player 100. The base 106 has a base height BH, a base width BW, and a base depth BD. In the illustrated embodiment, the base height BH is the shortest dimension and the base width BW is the greatest dimension. Referring to FIG. 11, the plinth 112 has a plinth height PH, a plinth width PW, and a plinth depth PD. In the illustrated embodiment, the plinth height PH is greater than the plinth width PW.

Figure 5:
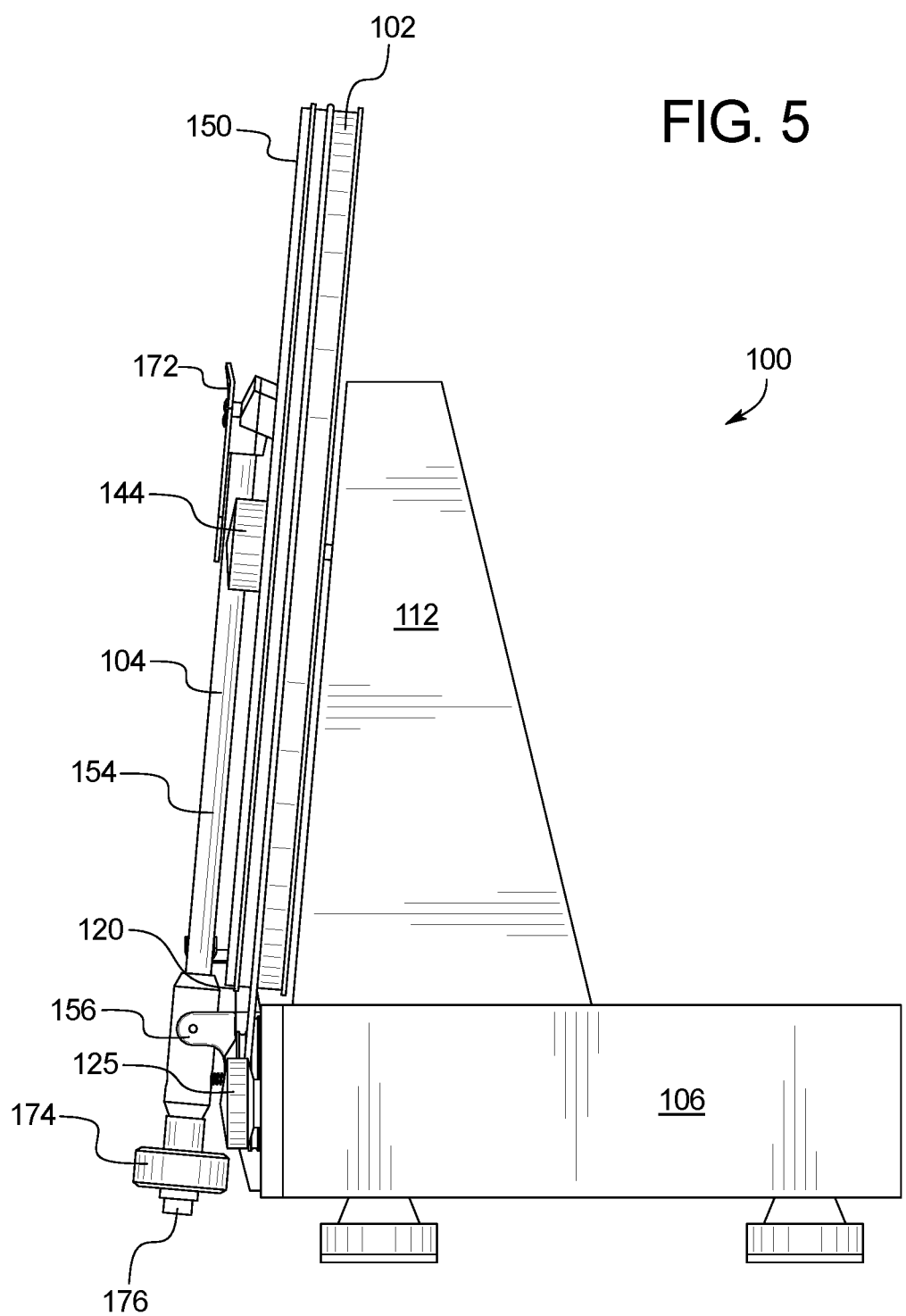
FIG. 5 is a right side elevation view of the record player of FIG. 1.
Figure 6:
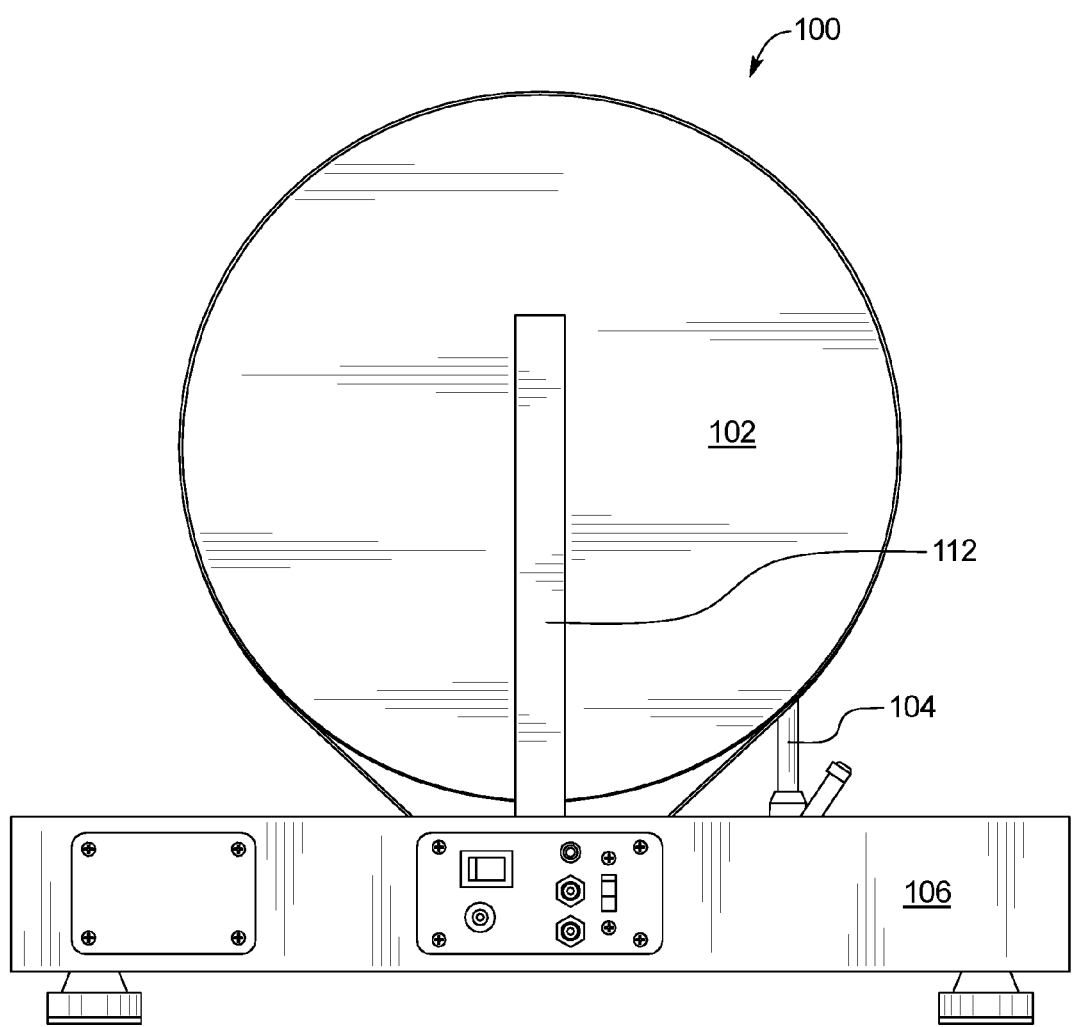
FIG. 6 is a rear view of the record player of FIG. 1.
Figure 7:
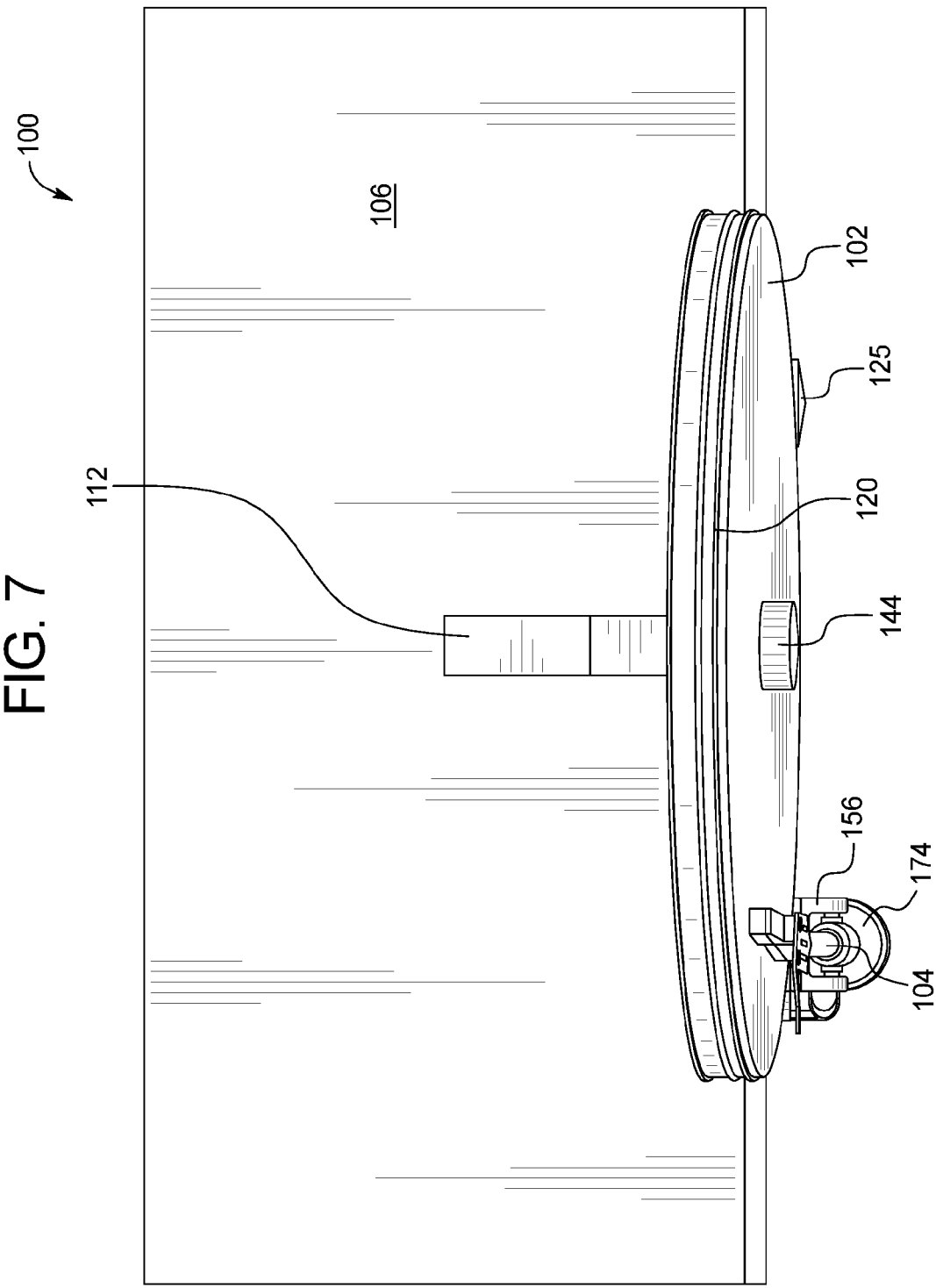
FIG. 7 is a top view of the record player of FIG. 1.
Figure 8:
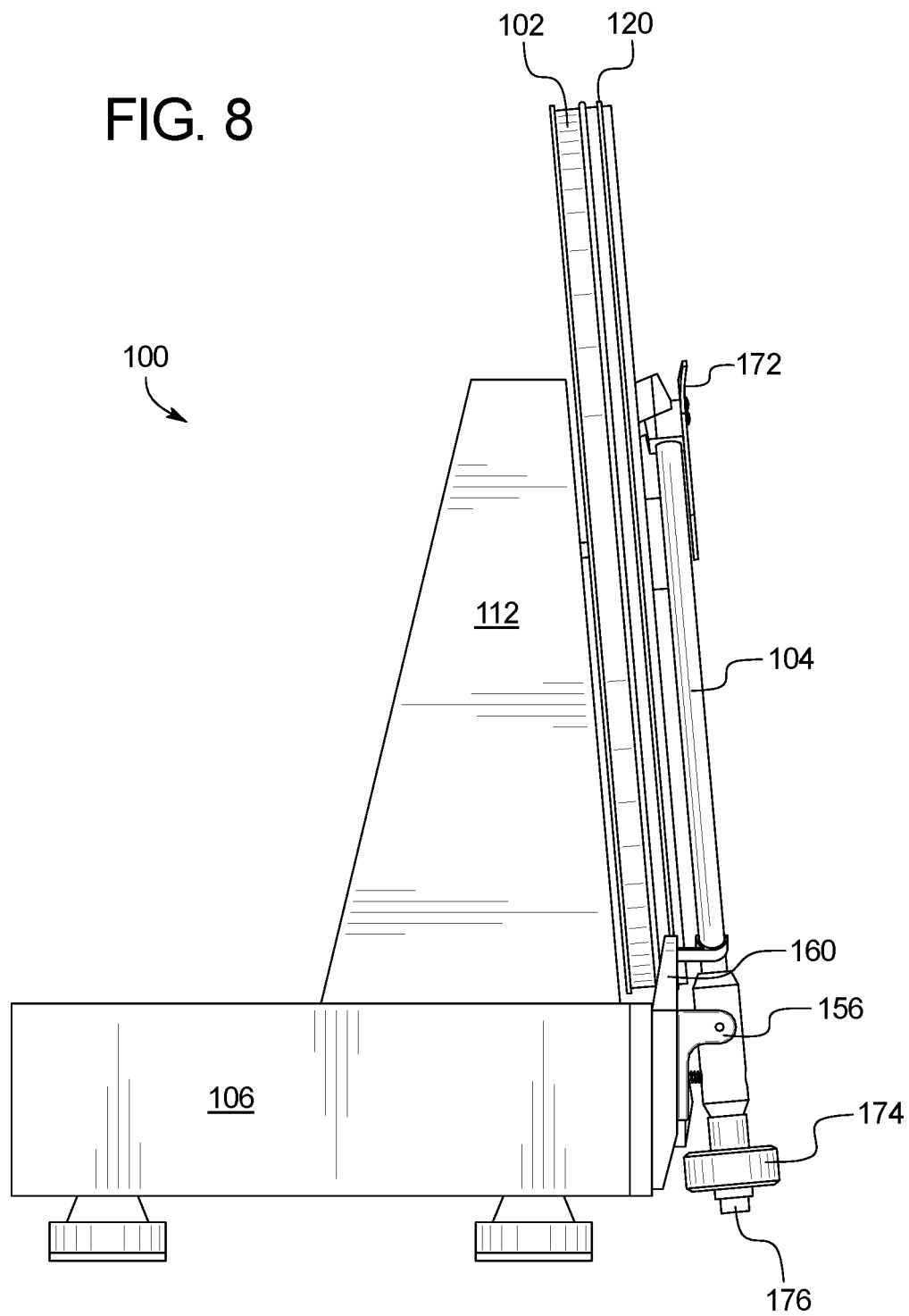
FIG. 8 is a left side elevation view of the record player of FIG. 1.
Figure 9:
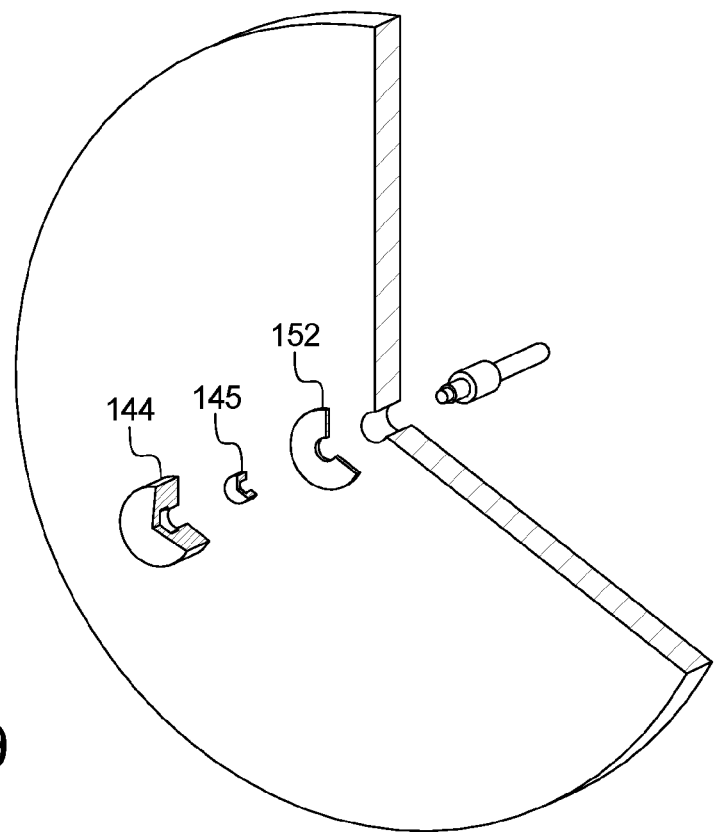
FIG. 9 is an isometric, exploded view of a platter of the record player of FIG. 1.
Figure 10:
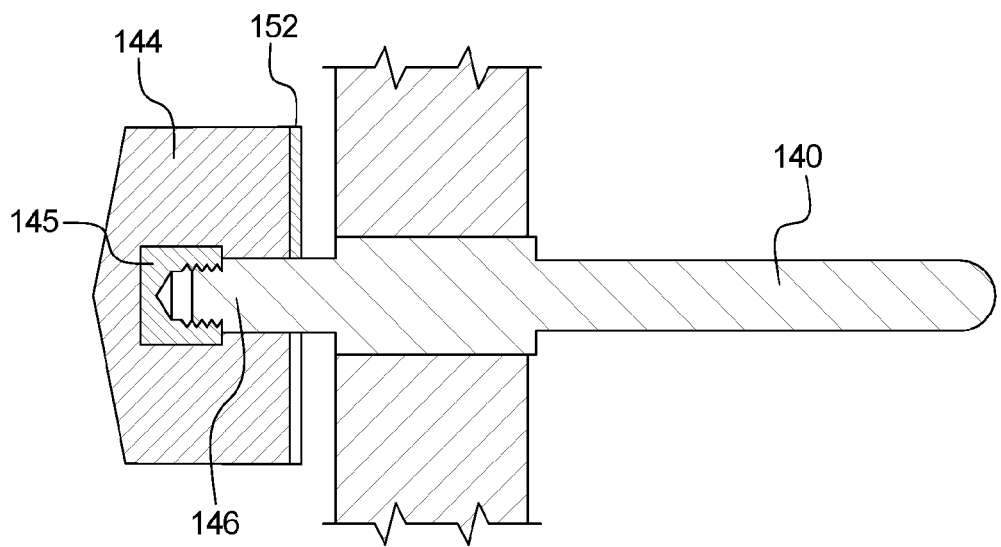
FIG. 10 is a cross sectional view of a spindle of the platter taken generally along the lines 10-10 of FIG. 9.

Referring to FIG. 5, the platter 102 is rotationally mounted at a front surface 116 of the plinth 112 in an orientation such that a diameter 118 of the platter is positioned nearly vertically above the base 106. In some embodiments, the platter 102 and a front face 148 of the plinth 112 may be angled up to about 10 degrees from the vertical. In another example, the platter 102 and a front face 148 of the plinth 112 may be angled up to about 20 degrees from the vertical. In other embodiments, the the platter 102 and a front face 148 of the plinth 112 may be at angles that differ from each other. For example, the platter 102 may be at an angle up to about 20 degrees from the vertical, while the front face 148 of the plinth 112 may be curved, or otherwise non-planar, or simply at an angle different from the platter 102.

Figure 2:
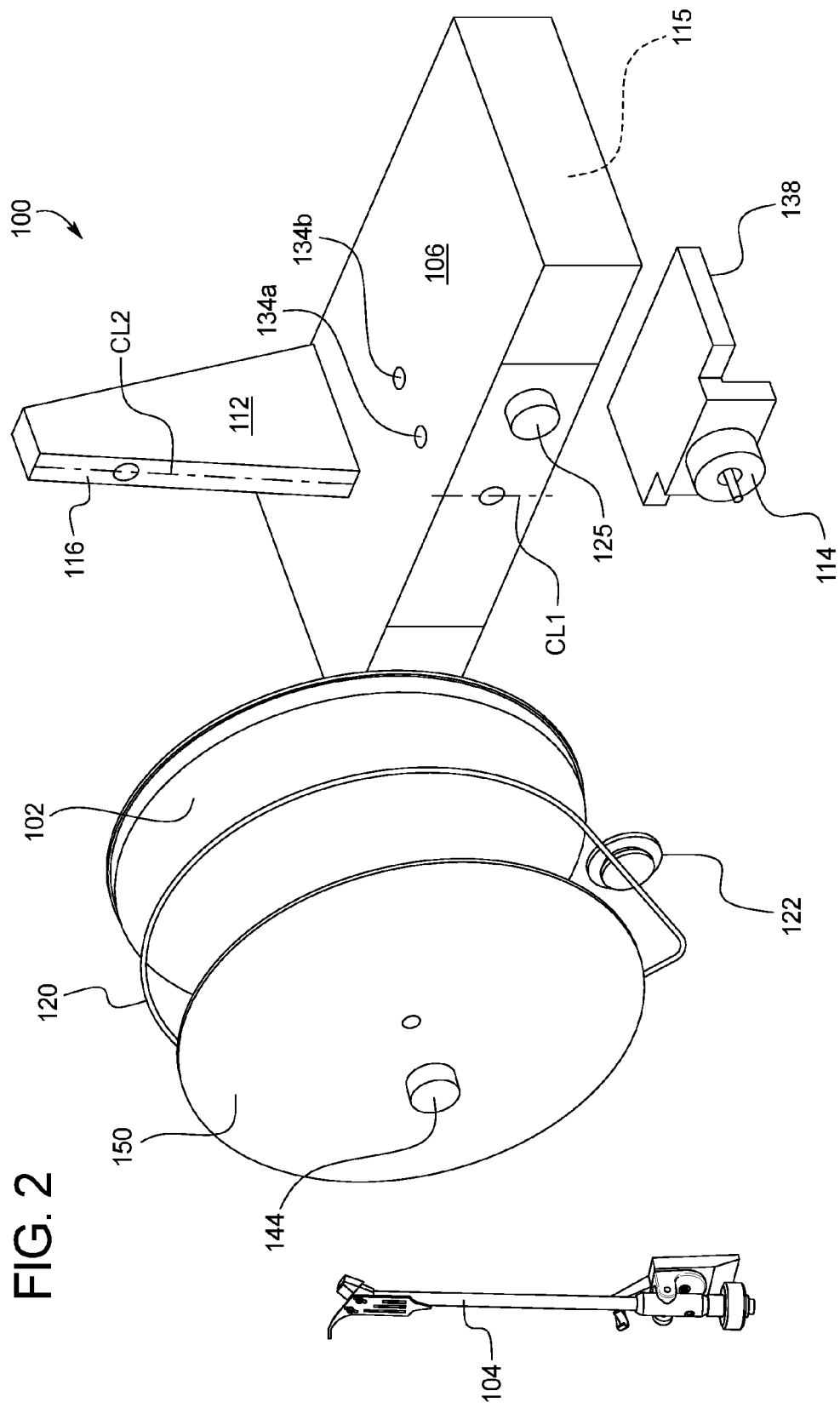
FIG. 2 is a front isometric exploded view of the record player of FIG. 1.
Figure 3:
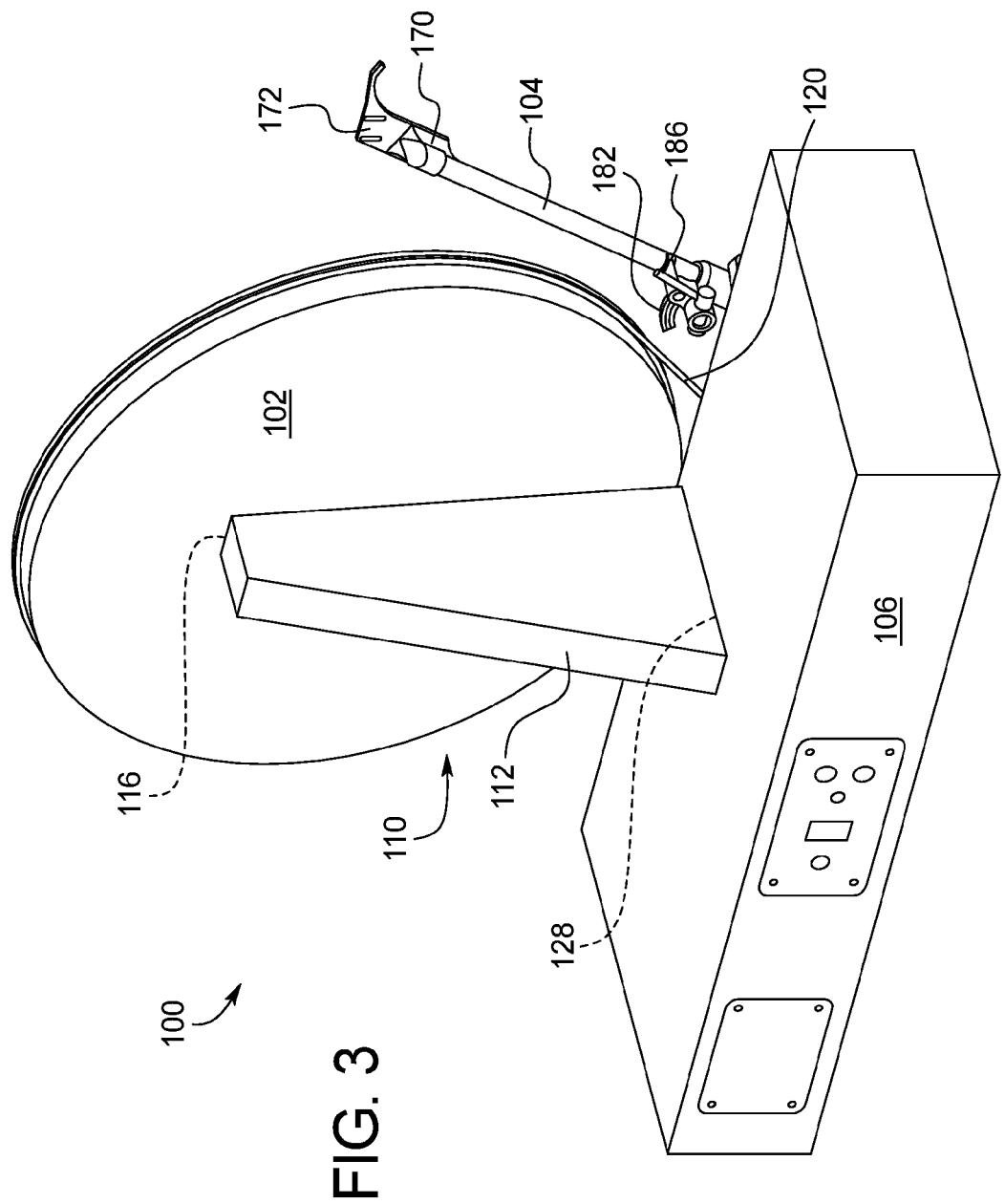
FIG. 3 is a rear isometric view of the record player of FIG. 1.
Figure 4:
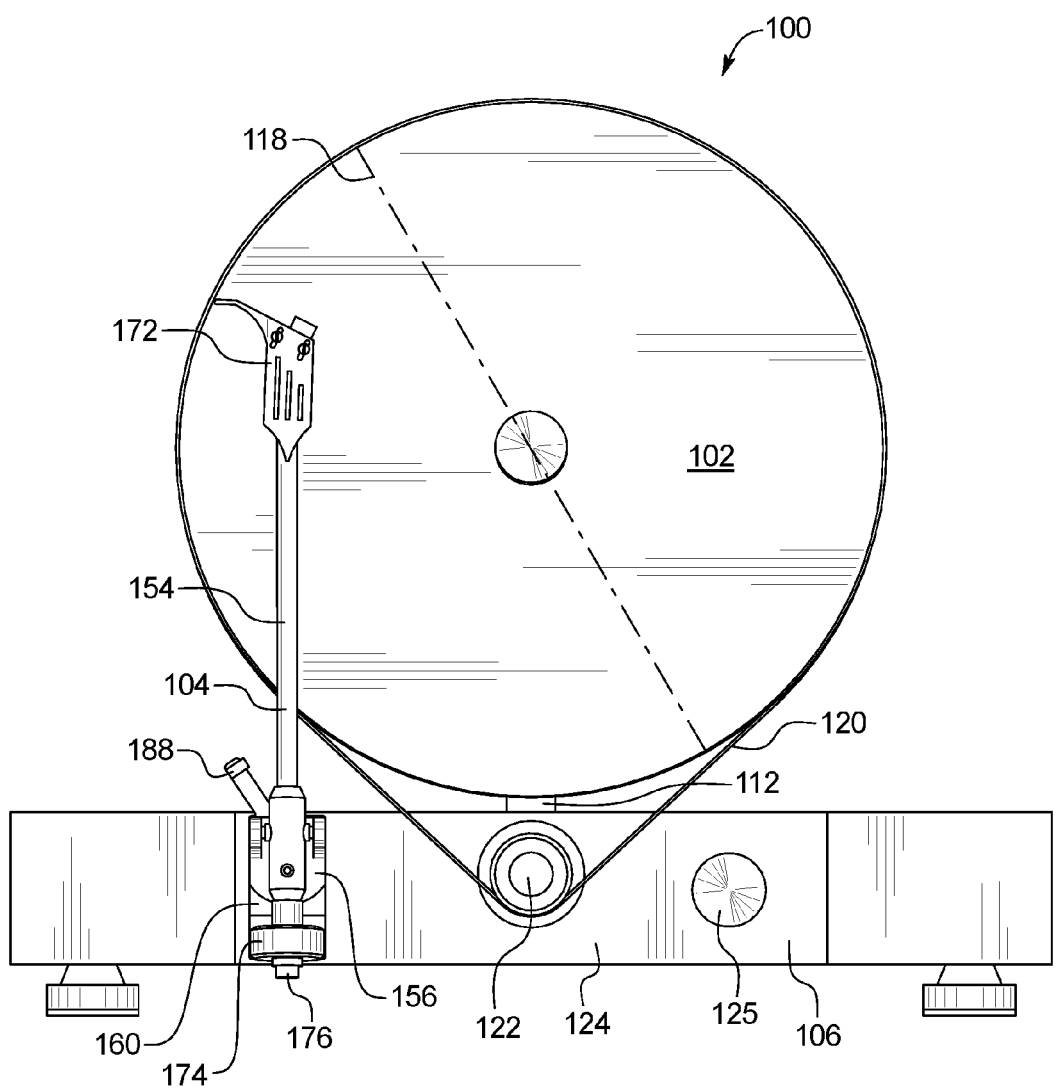
FIG. 4 is a front view of the record player of FIG. 1.

Seen in FIGS. 1-3, a belt 120 wraps around the platter 102 and a motor pulley 122 positioned on a front surface 124 of the base 106 below the platter 102. The motor 114 housed within the base 106 causes the motor pulley 122, and therefore the platter 102 by means of the belt 120, to rotate. In the example shown, to turn the motor 114 on, the user rotates the volume knob 125 on the front surface 124 of the base 106.

As shown, the platter-plinth-motor assembly 110 moves as a unit relative to the base 106 in the forward and rearward directions. A bottom surface 128 of the plinth 112 includes first and second openings 130a, 130b for receiving first and second fasteners 132a, 132b, respectively. First and second slots 134a, 134b on a top surface 136 of the base 106 receive the first and second fasteners 132a, 132b, respectively, and are sized so that the positioning of the first and second fasteners 132a, 132b can be moved within the first and second slots 134a, 134b. Further, the first and second fasteners 132a, 132b extend into a motor cover 138 (FIG. 2) within the base 106. The motor cover 138 maintains the positioning of the motor 114 relative to the plinth 112, compressing the motor 114 upwardly toward the plinth 112 to minimize motor vibration within the base 106 and also acts as a heat sink to dissipate heat within the base 106.

The platter-plinth-motor assembly 110 moves as a unit to allow for an adjustment of the distance between the tone arm 104 and the front face of the platter 102 while maintaining the relative positioning of the motor 114 with respect to the platter 102. This movement allows for adjustments necessary to adjust towards a parallel positioning of the tone arm 104 relative to the platter 102. The adjustments may be necessary if, for example, the height of the tone arm 104 needs to be modified for a specific record 101, a different sized cartridge is installed on the tone arm 104, or the tracking angle of the tone arm 104 needs to be modified for a specific record 101.

Referring to FIGS. 9-12, a spindle bushing 142 within the plinth 112 receives a spindle 140, which rotatably holds the platter 102 in position within the plinth 112. A record clamp 144 with a threaded insert 145 screws onto a threaded exterior end 146 of the spindle 140 to hold the record 101 in place. A felt mat 150 may be disposed between the record 101 and the platter 102, and a felt pad 152 may be disposed between the record clamp 144 and the record 101 during use.

Referring again to FIGS. 1 and 2, the tone arm 104 is rotationally secured to the front surface 124 of the base at a pivot point 152 and extends in a nearly vertically orientation. In the illustrated embodiment, the pivot point 152 is offset from a centerline CL1 (FIG. 2) of the front surface 124 of the base 106 and a centerline CL2 (FIG. 2) of the front surface 148 of the plinth 112. In some embodiments, the pivot point 152 may be adjustable along the base height BH.

Figure 13:
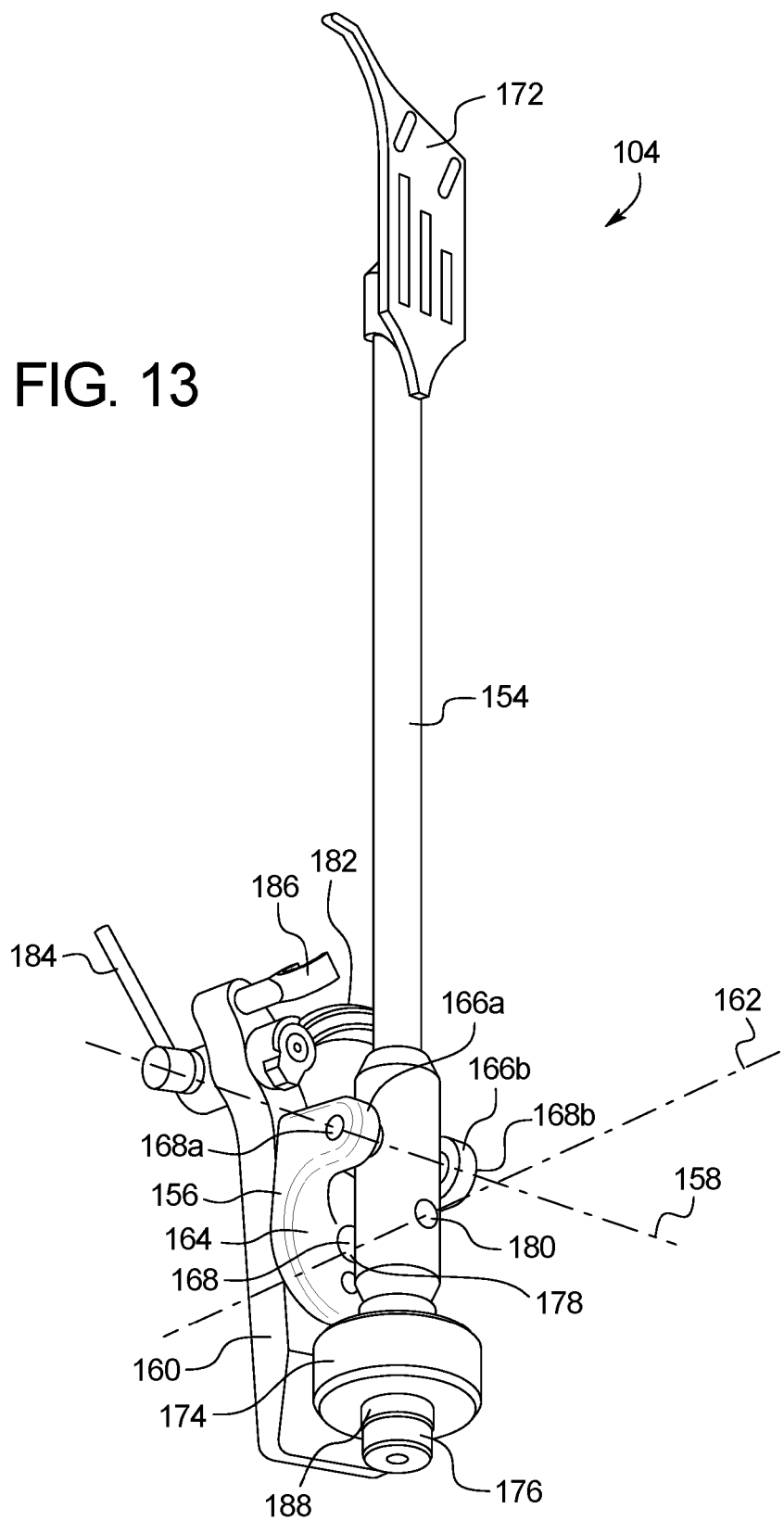
FIG. 13 is an isometric view of a tone arm assembly of the record player of FIG. 1.

As shown in FIG. 13, the tone arm 104 includes a tone arm shaft 154 that is rotationally mounted on a gimbal 156 to rotate about a first axis 158. The gimbal 156 is in turn rotationally mounted to a bearing base 160 to rotate about a second axis 162 different from the first axis 158. The bearing base 160 is secured to the front surface 124 of the base 106. The first axis 158 may be parallel to the front surface 124 of the base 106, and the second axis 162 may be perpendicular to the front surface 124 of the base 106.

A main body 164 of the gimbal 164 includes first and second forward protrusions 166a, 166b between which the tone arm shaft 154 extends. Screws 168a, 168b or other fasteners secure the tone arm shaft 154 between the protrusions 166a, 166b of the gimbal 156 to provide rotation about the first axis 158. A screw 168 or other fastener secures the gimbal 156 to the base bearing 160 to provide rotation about the second axis 162.

Further, the tone arm 104 includes a needle or stylus 170 at a first end 172 adjacent to the platter 102. A counterweight 174 is secured to a second end 176 of the tone arm 104 adjacent to the pivot point 152. Seen best in FIG. 13, a spring 178 compressed between the gimbal 156 and the tone arm shaft 154 at a position between the first axis 158 and the counterweight 174 urges the needle 170 toward the record 101. The needle 170 applies a tracking force to the record 101, and the spring 178 adjustable by a setscrew 180 controls the tracking force.

The bearing base 160 may also include a bearing surface 182 moveable between an active position and an inactive position using a handle 184. An arm dock 186 of the bearing base 160 holds the tone arm 104 when not in use. In the active position, the bearing surface 182 is positioned rearwardly so that the needle 170 of the tone arm 104 contacts the record 101. In the inactive position, the bearing surface 182 is positioned forwardly so that the needle 170 is spaced from the record 101. To use the record player 101, a user positions the bearing surface 182 in the inactive position, releases the tone arm 104 from the arm dock 186, rotates the tone arm 104 to the desired position relative to the record 101, rests the tone arm 104 against the bearing surface 182, and uses the handle 184 to move the bearing surface 182 to an active position, allowing the needle 170 of the tone arm 14 to contact the spinning record 101 so that music is played.

At the second end 176 of the tone arm shaft 154, the counterweight 174 of the tone arm 104 balances the needle 170 within the groove of the record 101 without favoring one sidewall of the groove over another. The counterweight 174 is positioned about a foam sleeve 188 on a tone arm shaft 154, both the counterweight 174 and sleeve 188 being held in place by friction fit. Sliding the counterweight 174 and sleeve 188 along the tone arm shaft 154 changes the distance from the first axis 158 to provide the radial balance. The foam sleeve 188 also provides isolation between the counterweight 174 and the tone arm 104 so that the volume does not have a negative effect on the tone arm performance.

Unlike a conventional record player with a horizontal record, the counterweight 174 of the record player 100 of the present application does not provide tracking force. Rather, the spring 178 between the gimbal 156 and the tone arm shaft 154 provides the tracking force. Further, there is no need for anti-skate mechanisms because the tone arm 104 is well balanced.

To tune the resonant frequency of the base 106 so that it did not interact with the tone arm 104, one or more weights may be positioned within the base. The total weight is about 2.25 pounds.

The materials of the components also increase the resonance dampening abilities. The tone arm shaft 154 may comprise carbon fiber or other similar materials. The platter 102 and the plinth 112 may be comprised of an acrylic material. The base 106 is wooden, such as high density MDF.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A record player for playing a record, comprising:
   a base including a front surface, wherein the base includes a base height, a base width, and a base depth, and wherein the base height is the shortest dimension and the base width is the greatest dimension;
   a plinth having a front surface, wherein the plinth is mounted atop the base and connected to a motor housed within the base, wherein the plinth includes a plinth height, a plinth width, and a plinth depth, and wherein the plinth height is greater than the plinth width;
   a platter rotationally mounted to the front surface of the plinth, wherein a diameter of the platter is nearly vertical above the base; and
   a tone arm secured to the front surface of the base;
   wherein the platter, the plinth, and the motor are movable as an assembly relative to the base and the assembly is moveable along the base depth; and
   wherein the plinth is secured to the base using one or more screws, wherein a top surface of the base includes one or more slots for receiving the one or more screws, and wherein each screw is moveable within each slot along the base depth.

2. The record player of claim 1, wherein the tone arm is mounted to the base at a pivot point in a nearly vertical orientation so that a first end of the tone arm is positioned above a second end of the tone arm.

3. The record player of claim 2, wherein the tone arm includes a counterweight between the pivot point and the second end.

4. The record player of claim 3, wherein a foam sleeve is friction fit onto the tone arm and the counterweight is friction fit onto the foam sleeve.

5. The record player of claim 3, wherein the tone arm includes a tone arm shaft rotationally mounted within a gimbal that is rotationally mounted to a bearing base.

6. The record player of claim 5, wherein the tone arm includes a needle at the first end and a spring compressed between the gimbal and the tone arm shaft at the second end, wherein the needle applies a tracking force to the record, and wherein the spring is adjustable by a setscrew to control the tracking force.

7. A record player for playing a record, comprising:
a base;
a plinth having a front surface, wherein the plinth is mounted atop the base, wherein the plinth includes a plinth height, a plinth width, and a plinth depth, and wherein the plinth height is greater than the plinth width;
a platter rotationally mounted to the front surface of the plinth, wherein the platter is in a nearly vertical orientation above the base; and
a tone arm rotationally mounted to the base at a pivot point offset from a centerline of a front surface of the base and a centerline of the front surface of the plinth, and wherein the tone arm includes a first end positioned above a second end.

8. The record player of claim 7, wherein the tone arm includes a shaft rotationally mounted on a gimbal to rotate about a first axis, and wherein the gimbal is rotationally mounted to a bearing base to rotate about a second axis different from the first axis.

9. The record player of claim 8, wherein the first axis is parallel to the front surface of the base and the second axis is perpendicular to the front surface of the base.

10. The record player of claim 8, wherein the bearing base includes an arm dock for receiving the tone arm.

11. The record player of claim 7, further comprising a motor pulley positioned on a front surface of the base and a belt wrapping around the platter and the motor pulley.

12. The record player of claim 7, wherein the platter includes a threaded spindle that receives a threaded record clamp.

13. The record player of claim 7, further comprising a motor cover within the base, wherein the motor cover compresses the motor upwardly towards the plinth.

14. The record player of claim 7, wherein the tone arm is comprised of carbon fiber.

\* \* \* \* \*